(12) United States Patent
Yaklin

(10) Patent No.: US 11,215,491 B2
(45) Date of Patent: Jan. 4, 2022

(54) SINGLE-VALVE BYPASS METER BAR AND METERING SYSTEM

(71) Applicant: A. Y. McDonald Mfg. Co., Dubuque, IA (US)

(72) Inventor: Sebastian Yaklin, Dubuque, IA (US)

(73) Assignee: A. Y. McDonald Mfg. Co., Des Moines, IA (US)

( * ) Notice: Subject to any disclaimer, the term of this patent is extended or adjusted under 35 U.S.C. 154(b) by 202 days.

(21) Appl. No.: 16/681,220

(22) Filed: Nov. 12, 2019

(65) Prior Publication Data

US 2020/0149945 A1 May 14, 2020

Related U.S. Application Data

(60) Provisional application No. 62/767,233, filed on Nov. 14, 2018.

(51) Int. Cl.
*G01F 15/18* (2006.01)
*G01F 15/00* (2006.01)

(52) U.S. Cl.
CPC .......... *G01F 15/185* (2013.01); *G01F 15/005* (2013.01)

(58) Field of Classification Search
None
See application file for complete search history.

(56) References Cited

U.S. PATENT DOCUMENTS 7,347,219 B2 3/2008 Godhe et al.
7,584,765 B2 9/2009 Gohde

*Primary Examiner* — Harshad R Patel
(74) *Attorney, Agent, or Firm* — Wood, Phillips, Katz, Clark & Mortimer

(57) ABSTRACT

A meter connector connecting a flow meter to a fluid line, including a meter bar with a spherical central void and fluid passages between the void and meter inlet and outlet ports and service inlet and outlet ports. A spherical valve is rotatable within the void to selectively block openings into the void and open openings into the void to selectively connect fluid passages via passages in the valve whereby rotation of the valve moves between a metering position, a bypass position, and a shutoff position.

18 Claims, 17 Drawing Sheets

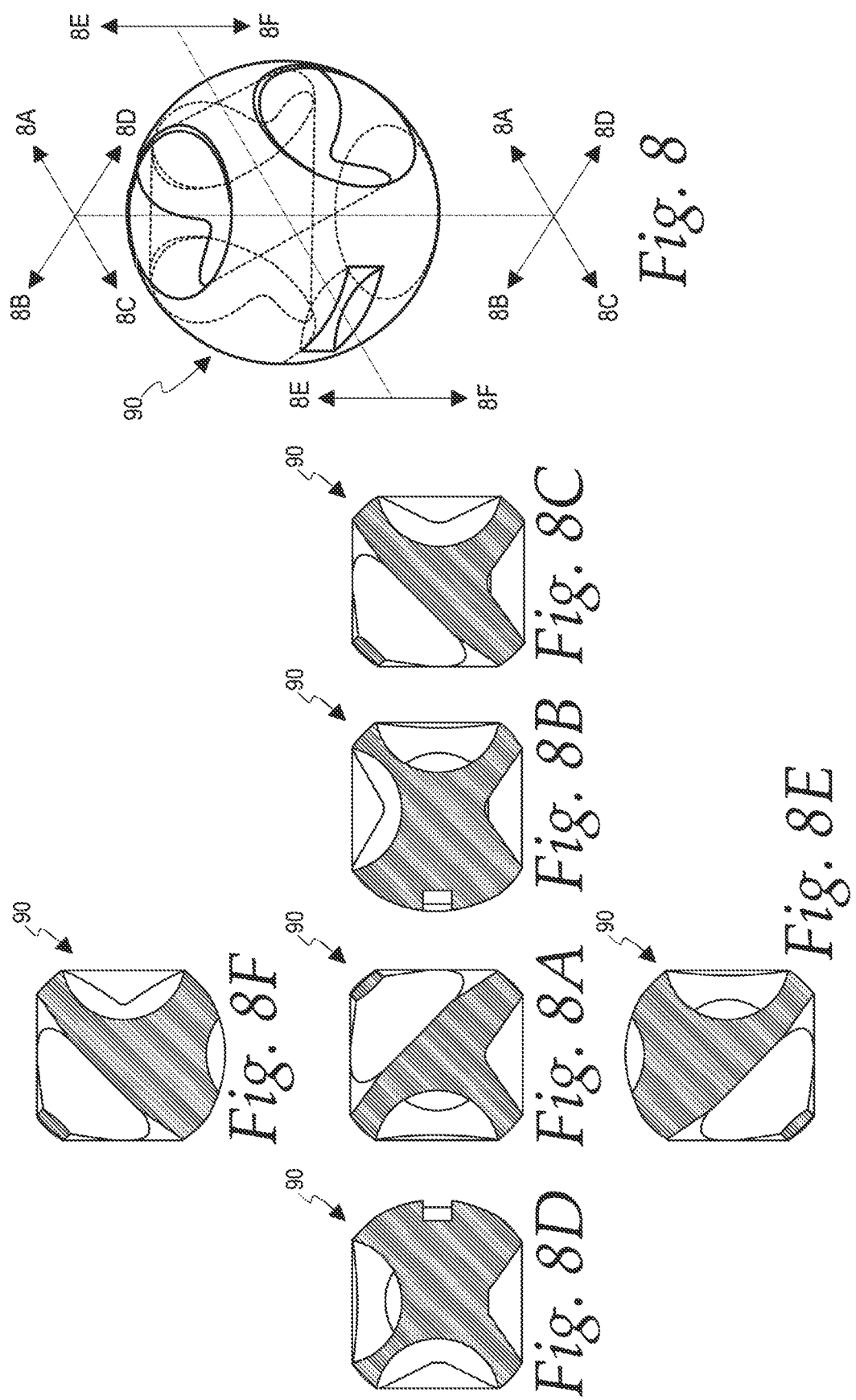

SINGLE-VALVE BYPASS METER BAR AND METERING SYSTEM

CROSS-REFERENCE TO RELATED APPLICATIONS

This application claims priority of Provisional Ser. No. 62/767,233, filed Nov. 14, 2018, the disclosure of which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to fluid metering connections which connect to service lines to measure flow of fluids through a connected service line.

BACKGROUND OF THE INVENTION

Many fluids, such as for example, natural gas or other gases are metered in a variety of different manners. Additionally, there are a variety of different providers of fluids, such as natural gas that employ a plurality of main pipelines to deliver fluids to end users. In order to measure the amount of the fluids that are delivered to individual end users, the providers use meters at the end user's facility. Such meters are well known in the art.

However, a variety of problems exist when the providers determine that the meters require servicing or replacement. When a provider services or replaces a meter, typically the supply of the fluid to the end user is stopped. However, it is typically desirable to avoid this flow stoppage. In part, this is because appliances and other devices requiring fluids, such as natural gas, may have pilot burners that continuously run to serve as an ignition source for the appliance. If the pilot burner were to be starved of gas, the burner would go out. Subsequently, when the gas service is restored, the pilot burner would have to be re-ignited to operate. Also, during servicing and/or replacement of a meter, the end user may have need of uninterrupted flow for continuous operation of appliances and devices requiring the fluid.

Therefore, a variety of bypass systems have been developed to supply fluid to an end user when the providers service or replace a fluid meter. However, these bypass systems have problems as well.

For example, as many of the bypass systems are temporary, they sometimes limit the supply of fluids and therefore can starve some of the devices. As devices are starved of the required fluids, they may become inoperable or damaged from the limited flow.

Additionally, many of the bypass systems have a variety of external components that must be installed prior to bypassing the meters. For example, an auxiliary port may be included in the bypass system which requires the use of external flow paths to bypass the location of the meter. These external components sometimes must be brought to the site by the service technician. Additionally, some bypass systems are bulky and can get in the way as the meter is serviced.

In several other bypass systems, the components needed to achieve meter bypass are internal to the system, and include two or more valves which must be operated in specific sequence to enter bypass mode. The complexity of such sequential operations can lead to incorrect operation of these valves which may, result in starving the service of the required fluids.

SUMMARY OF THE INVENTION

In one aspect of the structure disclosed herein, a meter connector connects a flow meter to a fluid line. The meter connector includes a meter bar and a valve. The meter bar includes a fluid inlet service port and a fluid service outlet port removably connectable in-line to the fluid line, and a first meter connector and a second meter connector, both removably connectable to the meter. The meter bar also includes an internal void within a boundary, wherein the boundary has first, second, third and fourth openings therethrough wherein (a) the first opening connects a fluid passage from the fluid inlet service port to the void, (b) the second opening connects a fluid passage from the first meter connector to the void, (c) the third opening connects a fluid passage from the second meter connector to the void, and (d) the fourth opening connects a fluid passage from the fluid service outlet port to the void. A valve is rotatable within the meter bar void to move between a metering position, a bypass position, and a shutoff position wherein (i) in the metering position, a first valve passage connects the first opening to the second opening and a second valve passage connects the third opening to the fourth opening, (ii) in the bypass position, the first valve passage connects the first opening to the fourth opening and the valve blocks the second and third openings from others of the openings, and (iii) in the shutoff position, the valve blocks the first opening from the second, third and fourth openings.

In a further form of this aspect of the disclosed structures, there is at least one intermediate position between the metering and bypass positions, and in the intermediate position the valve simultaneously connects the first opening to both the second and fourth openings.

In another form, the void is within a generally spherical boundary. In a further form, the valve is substantially spherical with at least the first valve passage therein.

In still another form, a lock on the valve to selectively prevent the valve from moving between the metering and bypass positions.

In yet another form of this aspect of the disclosed structures, the first valve passage is sufficiently sized to define a flow path between the first boundary opening to both the second and fourth openings when the valve is in an intermediate position between the metering and bypass positions. In a further form, indicators on exterior surfaces of the ball and meter bar indicate the position of the valve. In another further form, the valve in the bypass position defines a flow path between the first service port and the second service port.

In another form, a fluid meter includes a first fluid connection removably connected to the first meter connector, and a second fluid connection is coupled to the second meter connector whereby in the metering position fluid flows through the meter from the first fluid connection to the second fluid connection.

In still another form, seals are around the first opening, the second opening, the third opening and the fourth opening, wherein the valve seats against the seals in the metering position, the bypass position and the shutoff position.

In another aspect of the disclosed structures, a meter connector connects a flow meter to a fluid line. The meter connector includes a meter bar and a valve. The meter bar includes a fluid inlet service port and a fluid service outlet port removably connectable in-line to the fluid line, and a first meter connector and a second meter connector, both removably connectable to the meter. The meter bar also includes an internal void within a boundary, wherein the boundary is spherical and has first, second, third and fourth openings therethrough wherein (a) the first opening connects a fluid passage from the fluid inlet service port to the void, (b) the second opening connects a fluid passage from the first meter connector to the void, (c) the third opening connects a fluid passage from the second meter connector to the void, and (d) the fourth opening connects a fluid passage from the fluid service outlet port to the void. A generally spherical valve is rotatable within the meter bar void about a radius of the spherical boundary to move between a metering position, a bypass position, and a shutoff position wherein (i) in the metering position, a first valve passage connects the first opening to the second opening and a second valve passage connects the third opening to the fourth opening, (ii) in the bypass position, the first valve passage connects the first opening to the fourth opening and the valve blocks the second and third openings from others of the openings, and (iii) in the shutoff position, the valve blocks the first opening from the second, third and fourth openings. A lock is on the valve to selectively prevent the valve from moving between the metering and bypass positions. The first valve passage is sufficiently sized to define a flow path between the first boundary opening to both the second and fourth openings when the valve is in an intermediate position between the metering and bypass positions.

In a further form of this aspect of the disclosed structures, there is at least one intermediate position between the metering and bypass positions, and in the intermediate position the valve simultaneously connects the first opening to both the second and fourth openings.

In a still further form, indicators on exterior surfaces of the ball and meter bar indicate the position of the valve.

In yet a further form, the valve in the bypass position defines a flow path between the first service port and the second service port.

In another form, a fluid meter includes a first fluid connection removably connected to the first meter connector, and a second fluid connection is coupled to the second meter connector whereby in the metering position fluid flows through the meter from the first fluid connection to the second fluid connection.

In still another form, seals are around the first opening, the second opening, the third opening and the fourth opening, wherein the valve seats against the seals in the metering position, the bypass position and the shutoff position.

Other objects, features, and advantages of the invention will become apparent from a review of the entire specification, including the appended claims and drawings.

BRIEF DESCRIPTION OF THE DRAWINGS

FIG. 8 is a perspective view of the FIG. 7 ball valve indicating the planes of the cross-sections shown in FIGS. 8A to 8F.

DETAILED DESCRIPTION

Figure 1:
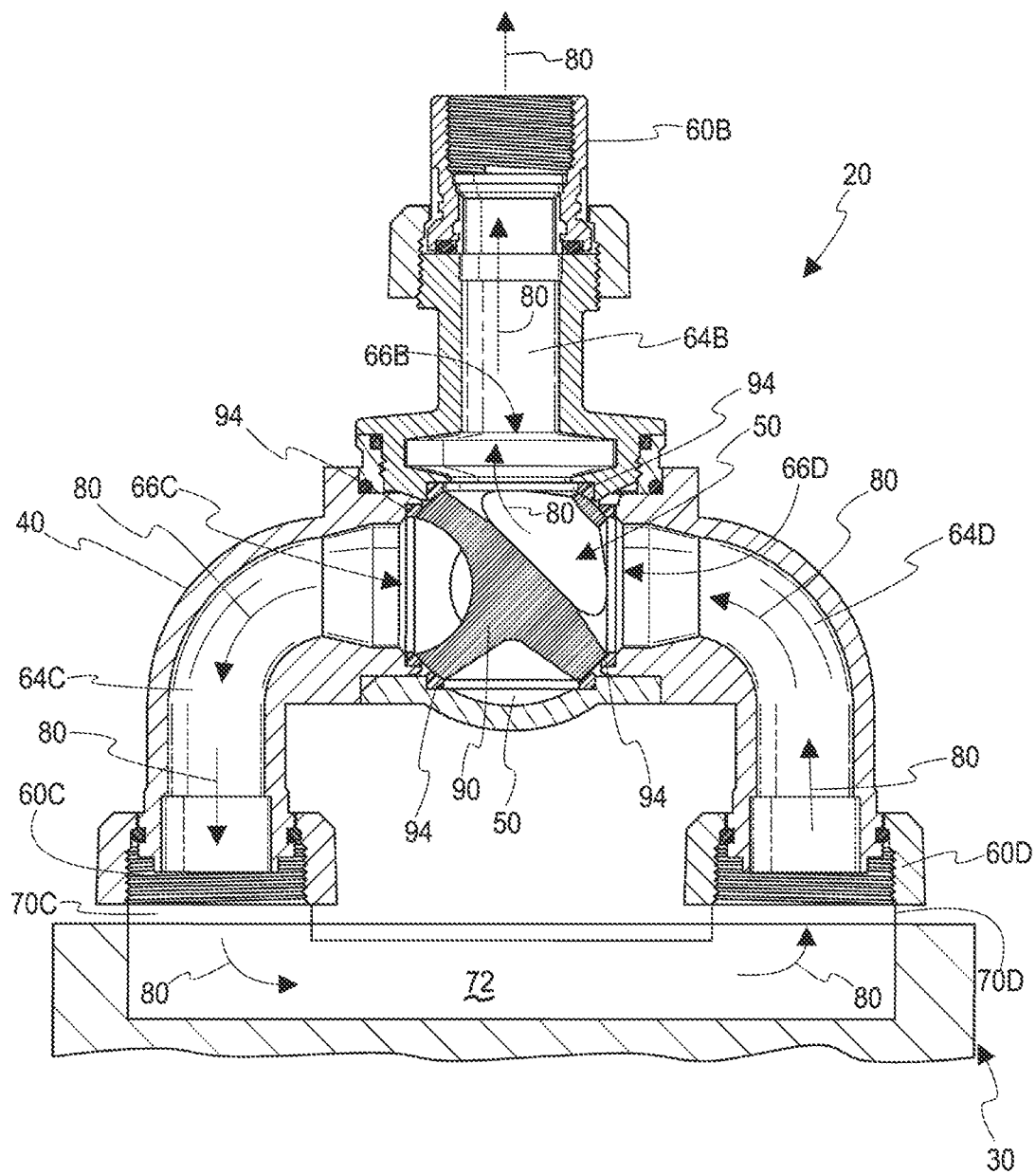
FIG. 1 is a front cutaway view of a meter bar in normal metering mode and attached meter.

The meter connectors disclosed herein are advantageously usable for connecting and servicing metering systems such as used in conjunction with natural gas flow lines. However, it should be understood that the advantageous features of the disclosed meter connectors may be used with a variety of fluid lines requiring metering.

FIGS. 1-6 disclose one exemplary embodiment of a meter connector 20 connectable to a flow meter 30. The flow meter 30 may be any meter which is suitable to meter flow of the particular fluid used in the system by having the fluid flow through the meter 30, and thus a flow meter 30 is illustrated in generic form connected to the meter connector 20 at the bottom of FIG. 1.

The meter connector 20 includes a meter bar 40 with an internal void 50 within a spherical boundary. The meter bar 40 also includes a plurality of ports 60 with a plurality of fluid passages defined between the ports and the internal void 50. Specifically:

(a) A fluid service inlet port 60A (see FIG. 4) is connectable to the fluid supply line being metered. A service supply passage 64A extends through the meter bar 40 between the fluid service inlet port 60A and the internal void 50. The boundary of the internal void 50 has an opening 66A therethrough through which fluid may selectively flow from the service supply passage 64A into the void 50.

(b) A fluid service outlet port 60B (see FIGS. 1-3) is connectable to the downstream service line being metered. A service outlet passage 64B extends through the meter bar 40 between the service outlet port 60B and the internal void 50. The boundary of the internal void 50 has an opening 66B therethrough through which fluid may selectively flow from the void 50 into the service outlet passage 64B into the void 50.

(c) A meter supply connector 60C (see FIGS. 1-3) is removably connectable to a meter supply connection 70C of the flow meter 30. A meter supply passage 64C extends through the meter bar 40 between the meter supply connector 60C and the internal void 50, and the boundary of the internal void 50 has an opening 66C therethrough through which fluid may selectively flow from the void 50 into the meter supply passage 64C and then through the meter supply connection 70C into the meter flow path 72 (see FIG. 1).

(d) A meter outlet connector 60D (see FIGS. 1-3) is removably connectable to a meter outlet connector 70D of the flow meter 30. A meter outlet passage 64D extends through the meter bar 40 between the meter outlet connector 60D and the internal void 50 and the boundary of the internal void 50 has an opening 66D therethrough through which fluid may selectively flow from the void 50 from the meter flow path 72 into the meter outlet passage 64D and then into the void (see FIG. 1).

As illustrated in FIG. 1 and as described above (and further below), when the meter connector 20 is configured and in a metering position, the fluid will flow from the service line into the service inlet port 60A, then through the service supply passage 64A to the void 50. Fluid will then flow out of the void 50 into the meter inlet passage 64C and from there through the meter inlet connector 60C and meter supply connection 70C into the meter flow path 72 where the meter 30 will meter the flow. Fluid will further flow out of the meter 30 through the meter outlet connection 70D and meter outlet connector 60D into the meter outlet passage 64D and then through opening 66D into the void 50. Finally, fluid flows from the void 50 into the service outlet passage 64B and through the service outlet port 60B into the downstream service line. This flow is indicated by the arrows 80 in FIGS. 1 and 4.

It should be appreciated that while fluid flow is described herein in one direction, flow could be in opposite directions so long as flow through the meter 30 is appropriate for operation of the meter 30. Thus, for example, flow in the metering position could be through the meter bar 40 from fluid inlet at port 60A and then out port 60B.

Figure 4:
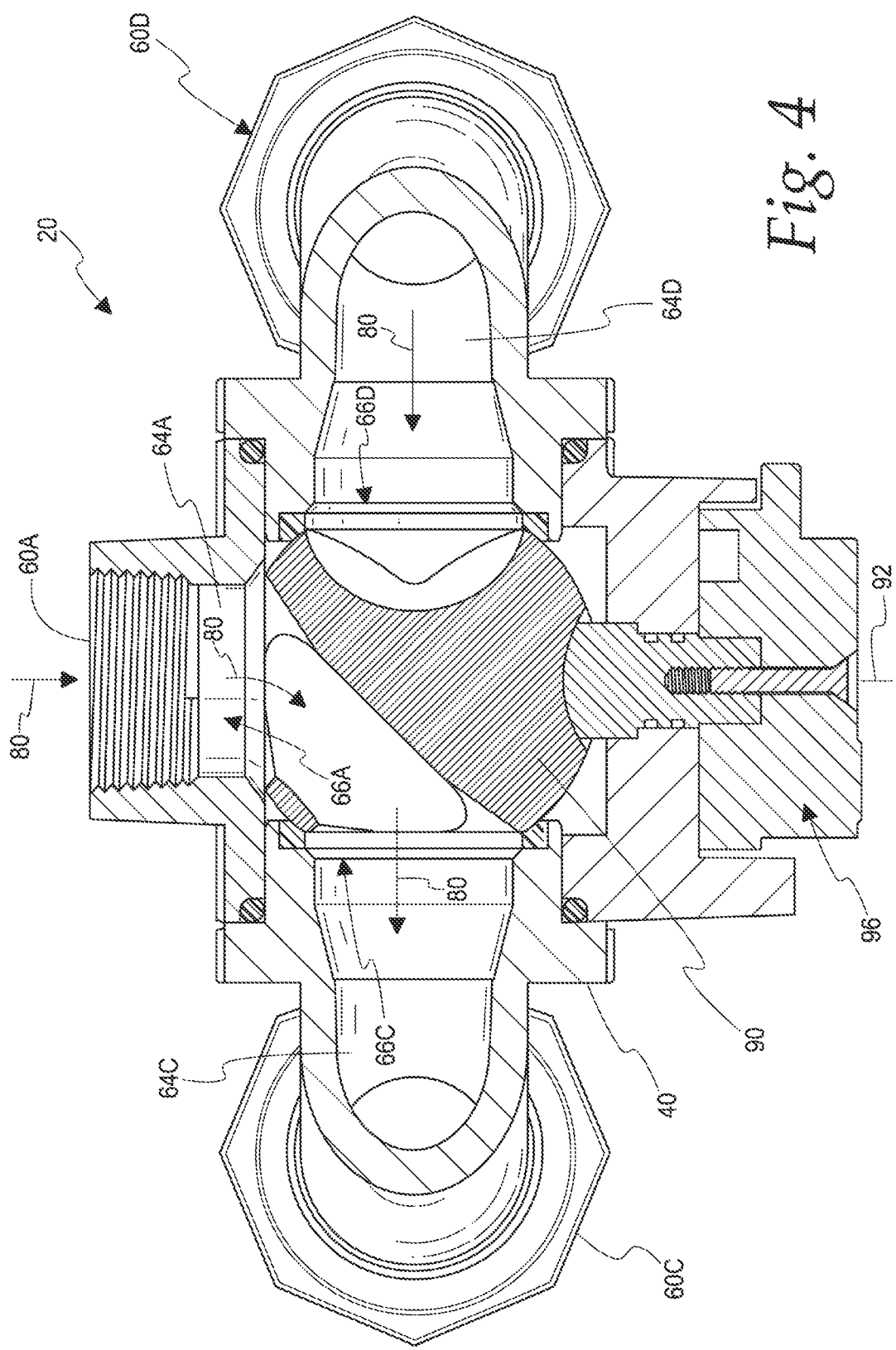
FIG. 4 is a top cutaway view of the meter bar of FIG. 1.
Figure 5:
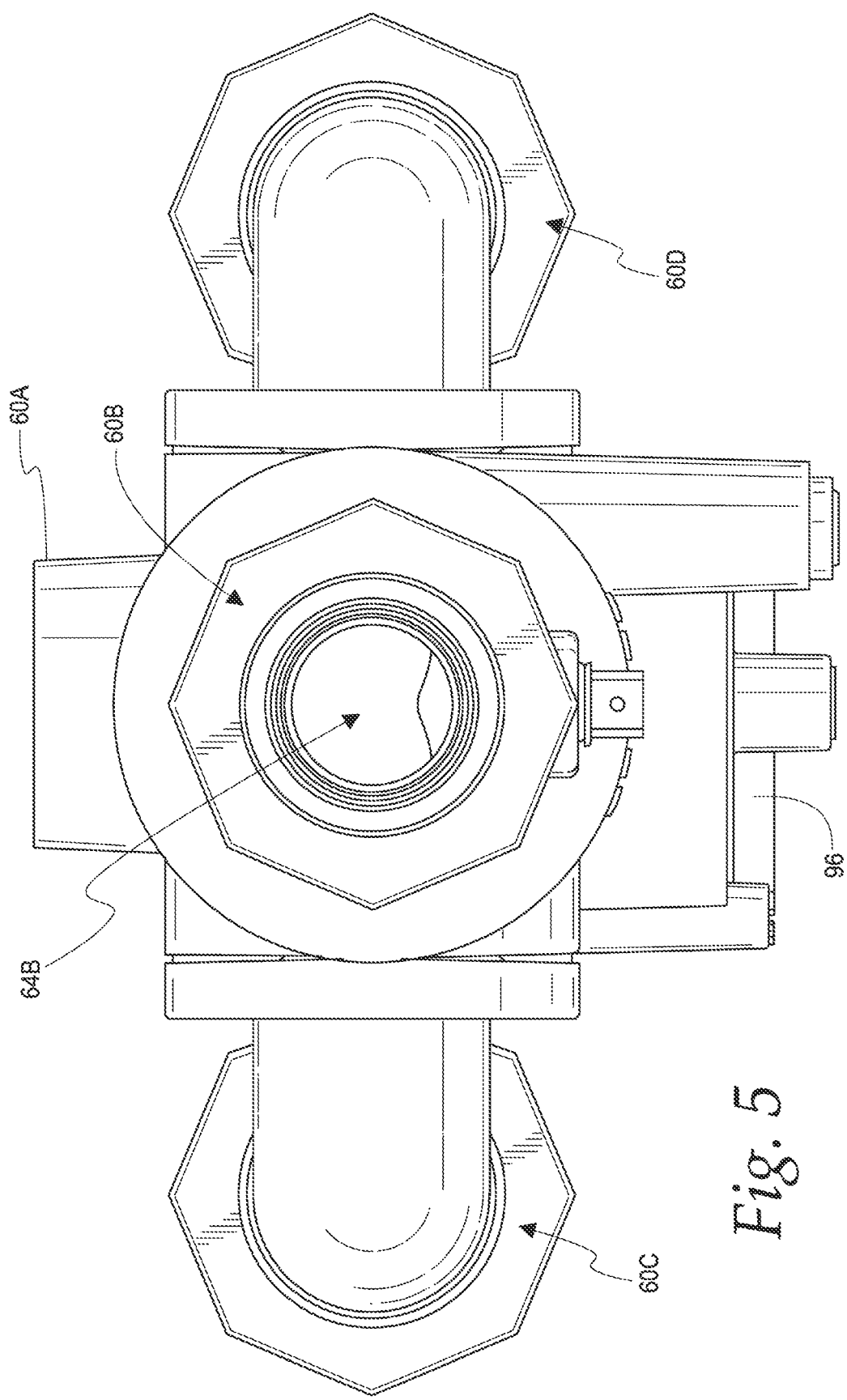
FIG. 5 is a top exterior view of the meter bar of FIG. 1.

A spherical valve 90 has an outer surface substantially corresponding to the boundary of the meter bar void 50 and is rotatable within the void 50 about a radius 92 of the sphere (see FIG. 4). Suitable seals 94 (such as, e.g., O-rings and/or sealing gaskets) are provided around the void openings 66A-D whereby the valve 90 seals around the openings 66A-D to prevent leakage around the spherical valve 90 into different passages 64A-D.

The valve 90 is configured so that it may be rotated about the radius 92 between different positions for different connections. Specifically, as previously described, the valve 90 may be configured as shown in FIG. 1 as a metering position, where fluid flows according to arrows 80 through the meter 30 as during normal service operation.

Figure 2:
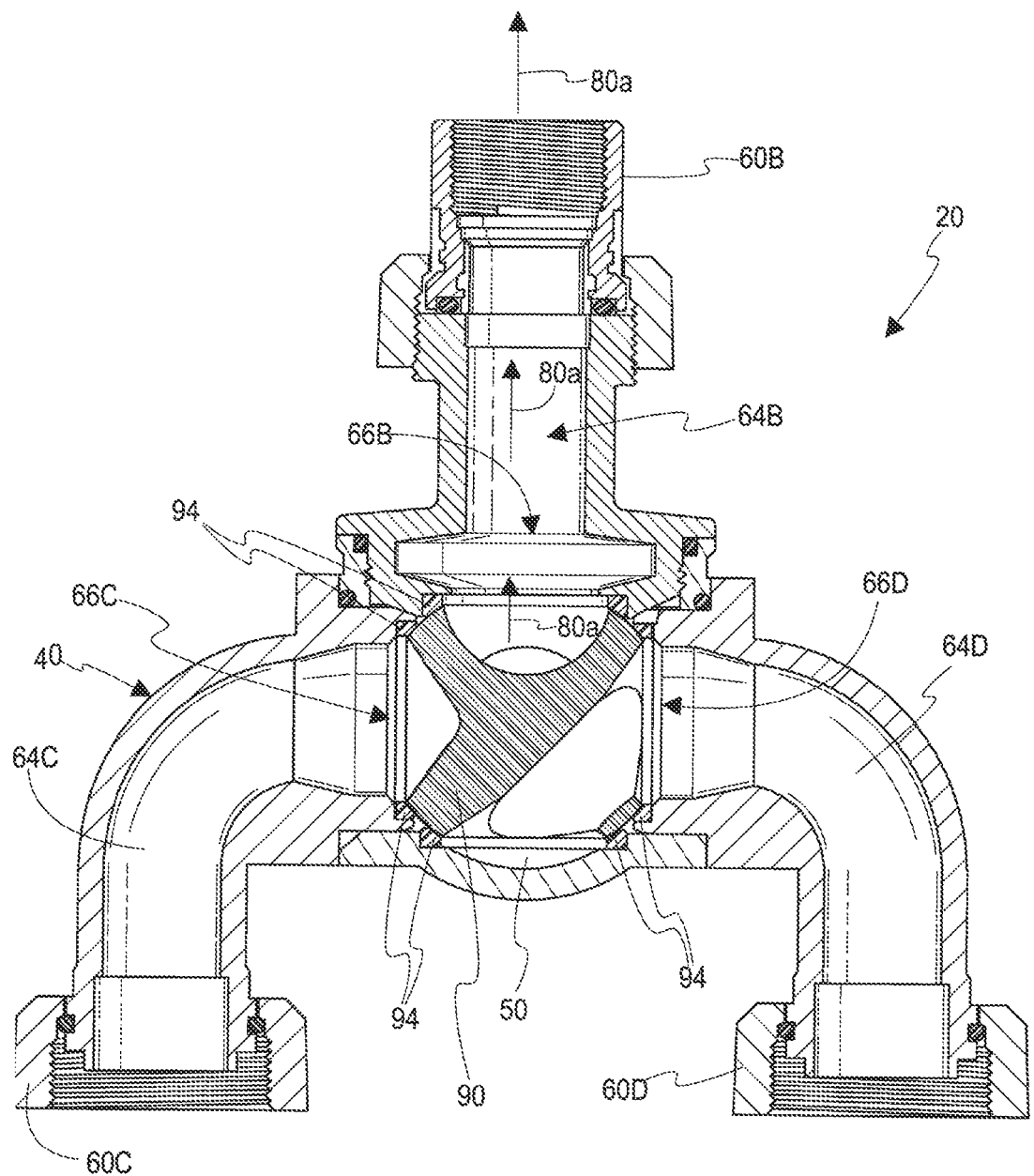
FIG. 2 is a front cutaway view of the meter bar of FIG. 1 in bypass mode.

The valve 90 may be rotated in a clockwise direction to change from the metering position (FIG. 1) to a bypass position as shown in FIG. 2. In the bypass position, the valve 90 is positioned so that the service inlet passage 64A is connected to only the service outlet passage 64B (see arrows 80a in FIG. 2), with the valve 90 blocking fluid from the service inlet passage 64A from entering the meter inlet passage 64C and meter outlet passage 64D through their associated openings 66C, 66D. It should thus be appreciated that in the bypass position, the meter 30 may be removed for servicing and/or replacing without fluid escaping from the meter connector 20. Moreover, it should be appreciated that changing from the metering position (i.e., normal service) to the bypass position (for servicing and/or replacing the meter 30) may be accomplished without disadvantageously interrupting flow to the end user. The valve 90 may be rotated clockwise to the bypass position by turning an external drive member 96 (see FIG. 4) suitably connected to the valve 90 for rotation there with around the radius 92.

Figure 3:
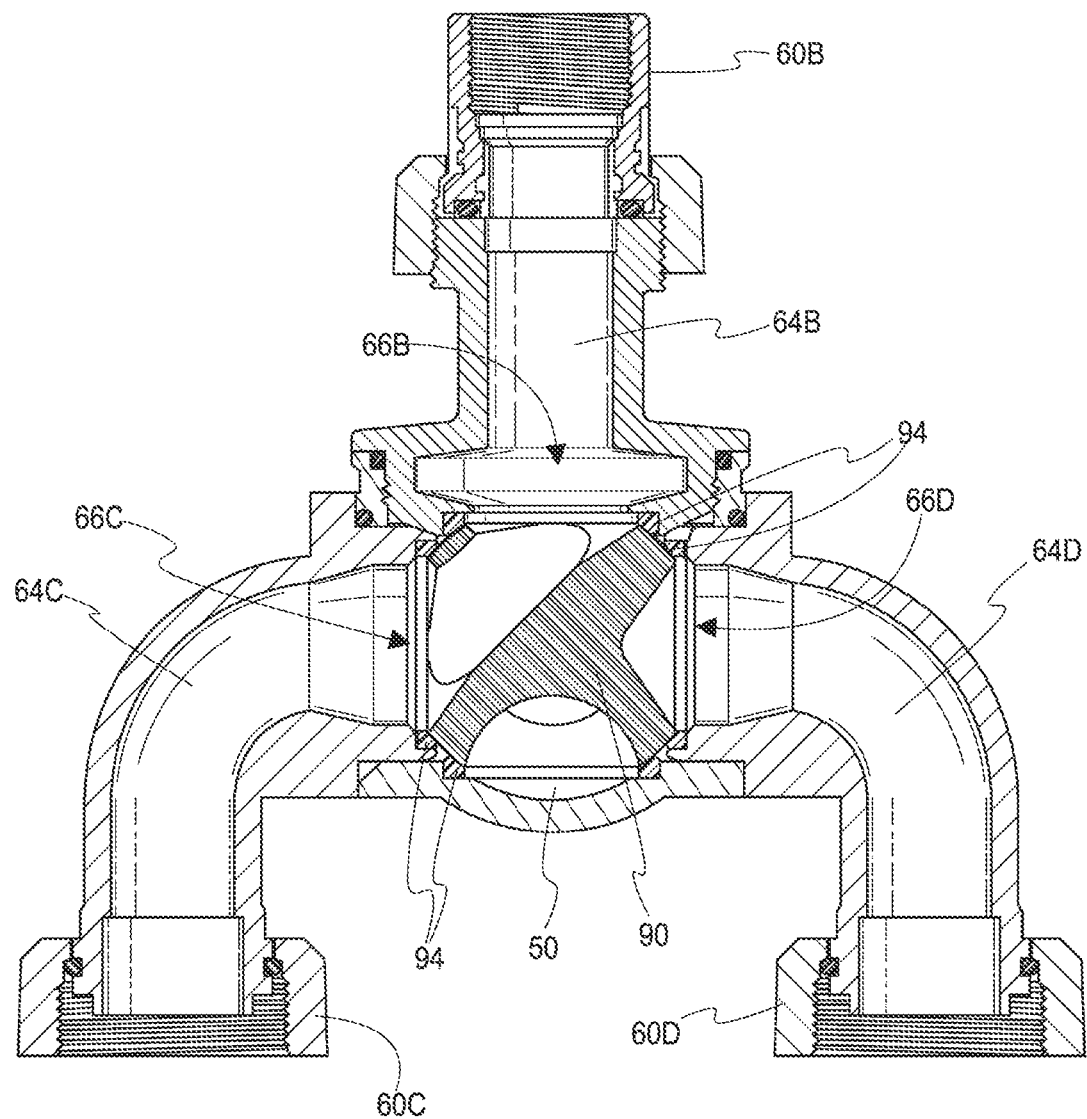
FIG. 3 is a front cutaway view of the meter bar of FIG. 1 in shutoff mode.

In a shutoff position as shown in FIG. 3, the valve 90 is positioned so that it blocks off void opening 66A, thereby completely shutting off fluid flow from the service inlet line.

It should also be appreciated that at least one intermediate position may be provided between the metering and bypass positions (FIGS. 1 and 2), in which the valve 90 simultaneously connects the service inlet passage 64A to both the meter inlet passage 64C and the service outlet passage 64B through the void 50. In this position, fluid is maintained in the service line while also flushing the meter flow path 72 as is desirable following servicing and/or replacement of the meter 30. However, it should be understood that as used herein, an intermediate position can be any position wherein the valve defines a flow path between more than two ports, and an intermediate position may or may not exist between the metering and bypass positions. Additionally, it should be understood that there are any number of intermediate positions and therefore the intermediate position is not a necessarily discrete position.

Figure 10:
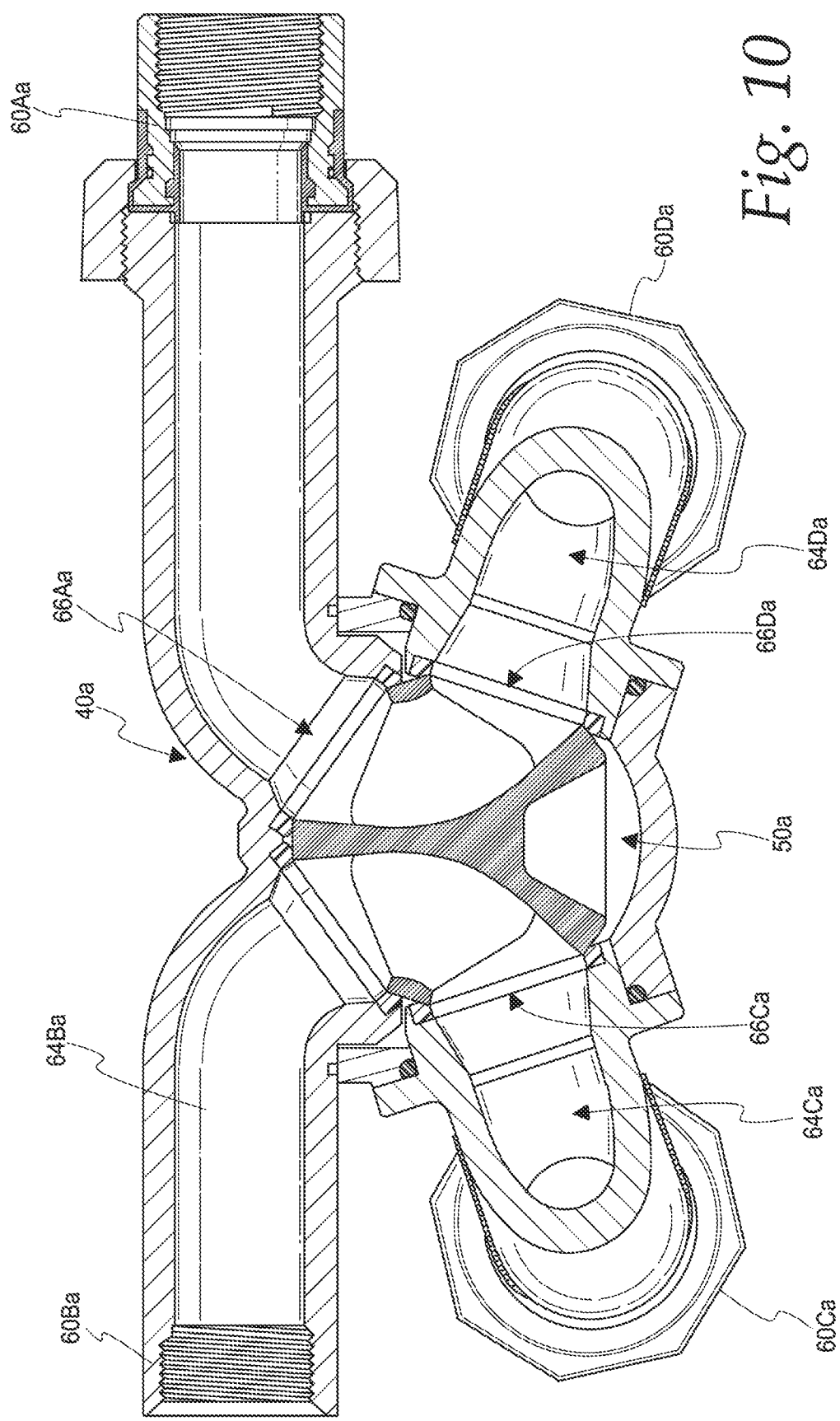
FIG. 10 is a top cutaway view of an alternative embodiment of a meter bar.
Figure 11:
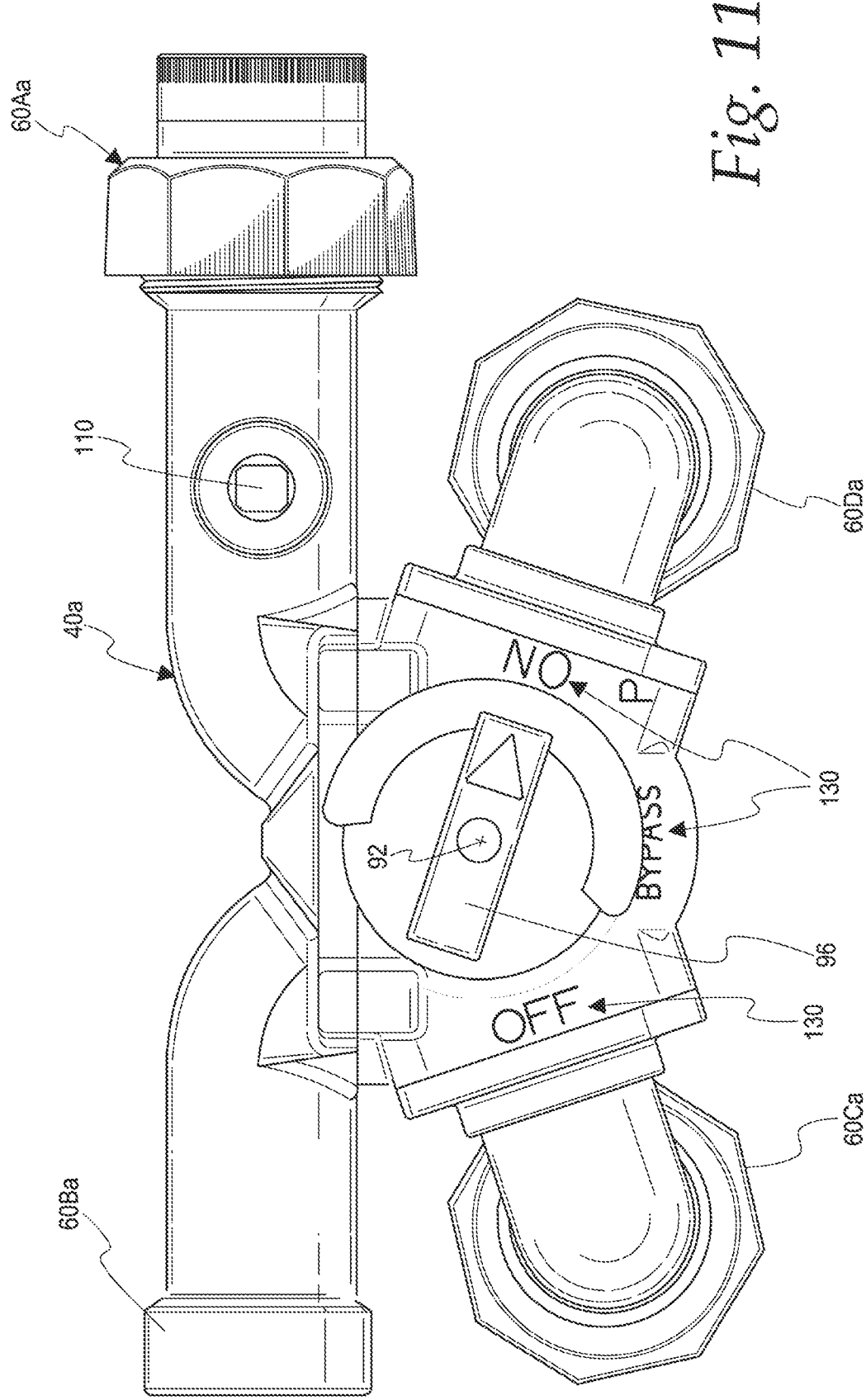
FIG. 11 is a top view of the meter bar of FIG. 10.
Figure 12:
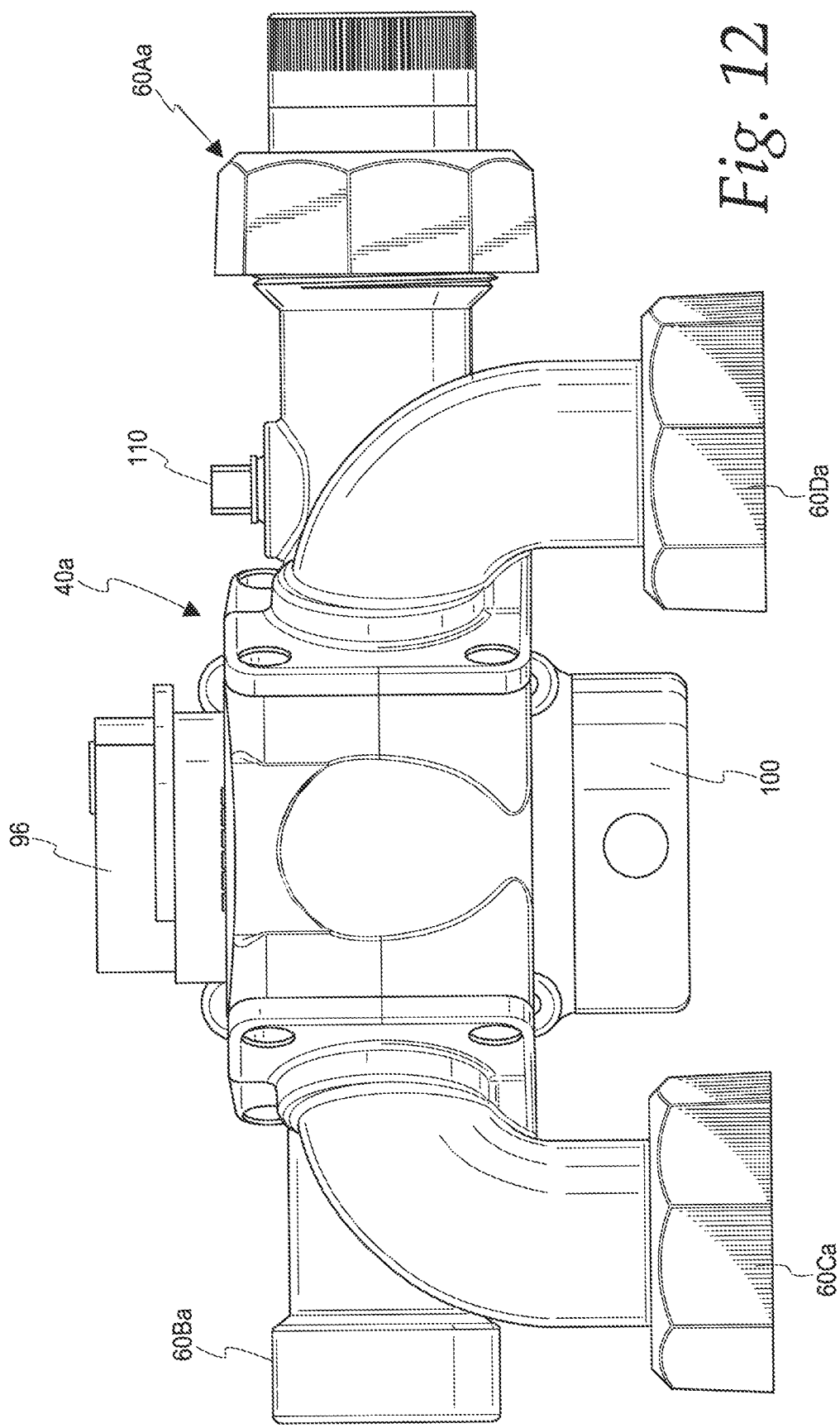
FIG. 12 is a front view of the meter bar of FIG. 10.
Figure 15:
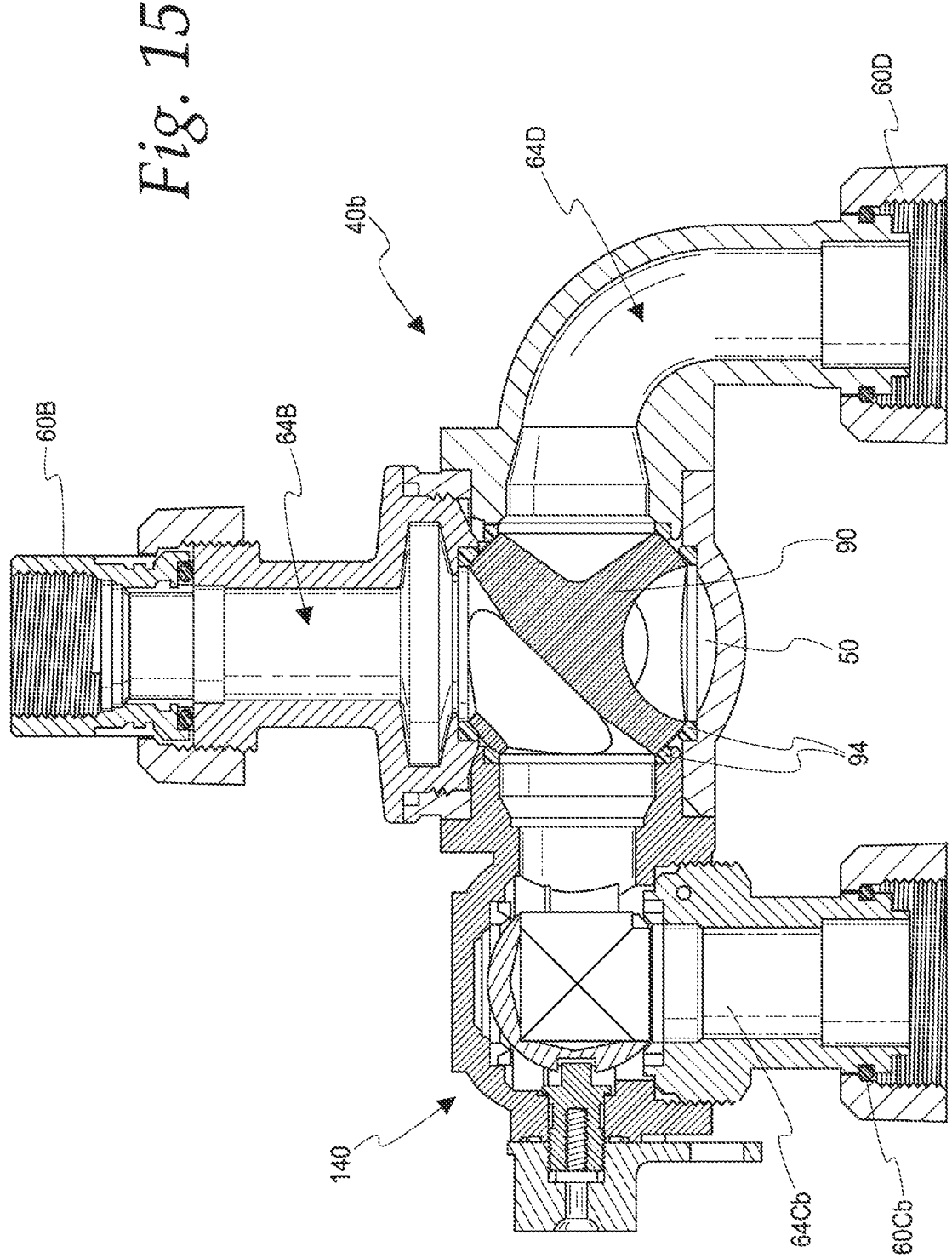
FIG. 15 is a front cutaway view of another alternative embodiment of a meter bar with a shutoff valve.

It should be appreciated that the ports 60A-D and passages 64A-D as illustrated in the Figures may take any number of forms and orientations. FIGS. 10-12, for example, illustrate just one alternate form with differently configured ports and passages. (It should be noted that reference numbers for components comparable but not identical to FIGS. 1-4 in alternative embodiments include "a", "b", "c" and "d". Thus, the meter bar is referenced as 40a in FIGS. 10-12, 40b in FIG. 15, 40c in FIGS. 16 and 40d in FIG. 17. However, in FIGS. 15, 16 and 17 where the configuration of the meter outlet passage is the same as in FIG. 1, the same reference number [64D] is used, whereas in the differently configured FIGS. 10-12 structure, the meter outlet passage is referenced as 64 Da). As such, it should be understood that while the ports 60B-D are shown in FIG. 1 as extending along the plane of the drawing paper, and the port 60A is shown extending into the plane of the drawing paper, it should be understood that the relative orientations may change in other embodiments and may, for example, extend into, out of, or at an angle to the plane of the drawing paper. Moreover, the sizes of the ports and apertures may be controlled as desired to provide desired flow rates when in intermediate positions.

Moreover, it should be appreciated that a variety of different valves may be used. For example, as illustrated in FIGS. 1-4, the valve 90 is a rotatable, two-passage ball valve as further illustrated in FIGS. 7, 8A-F and 9A-F (with the cross-section of FIG. 8A corresponding to the cross-section of the valve 90 in FIGS. 1-3, albeit in different rotational positions, and the cross-section of FIG. 8F corresponding to the cross-section of the valve 90 in FIG. 4).

Figure 13:
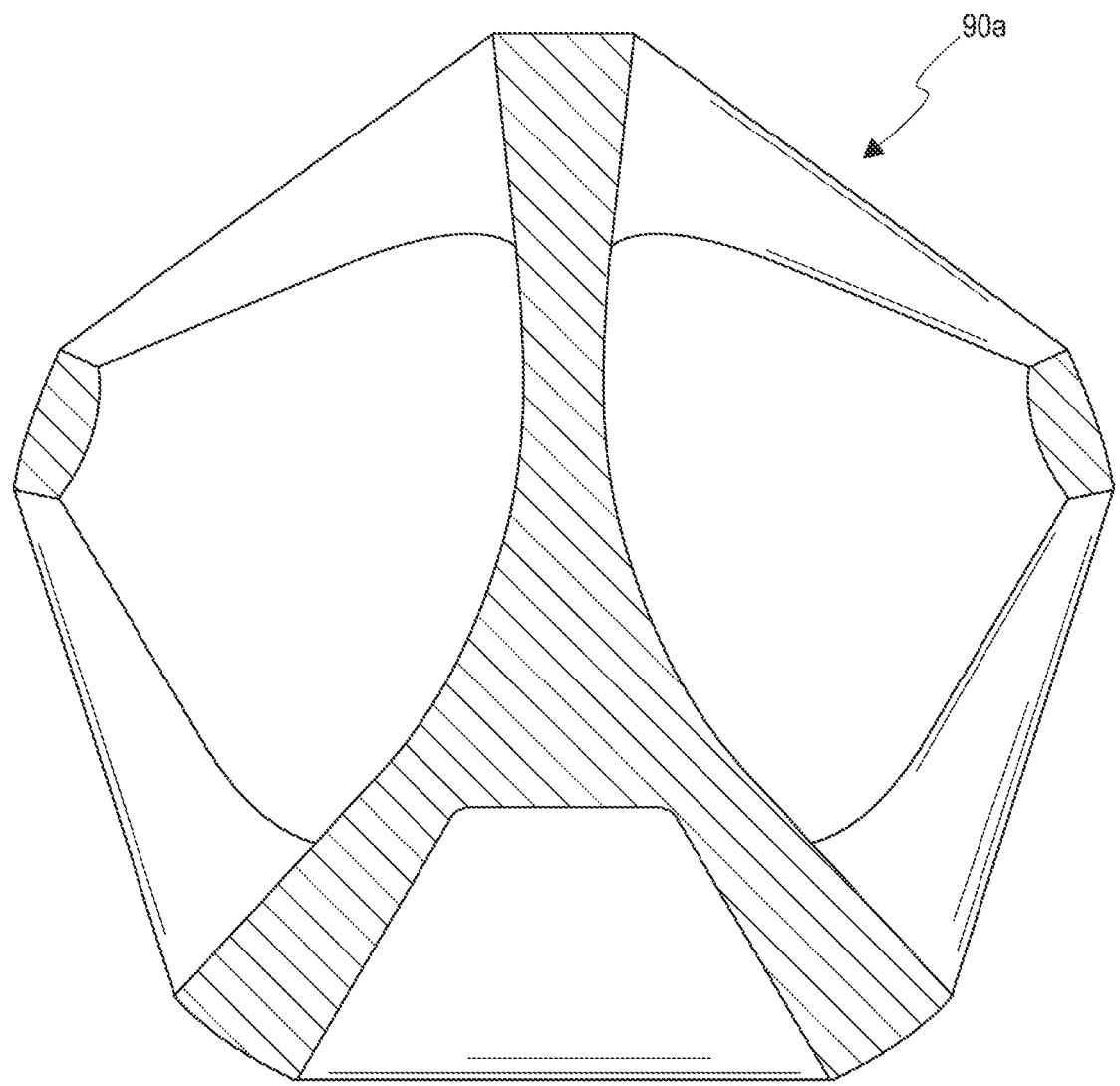
FIG. 13 is a top cutaway view of a ball valve as used with the alternate meter bar of FIG. 10.
Figure 14:
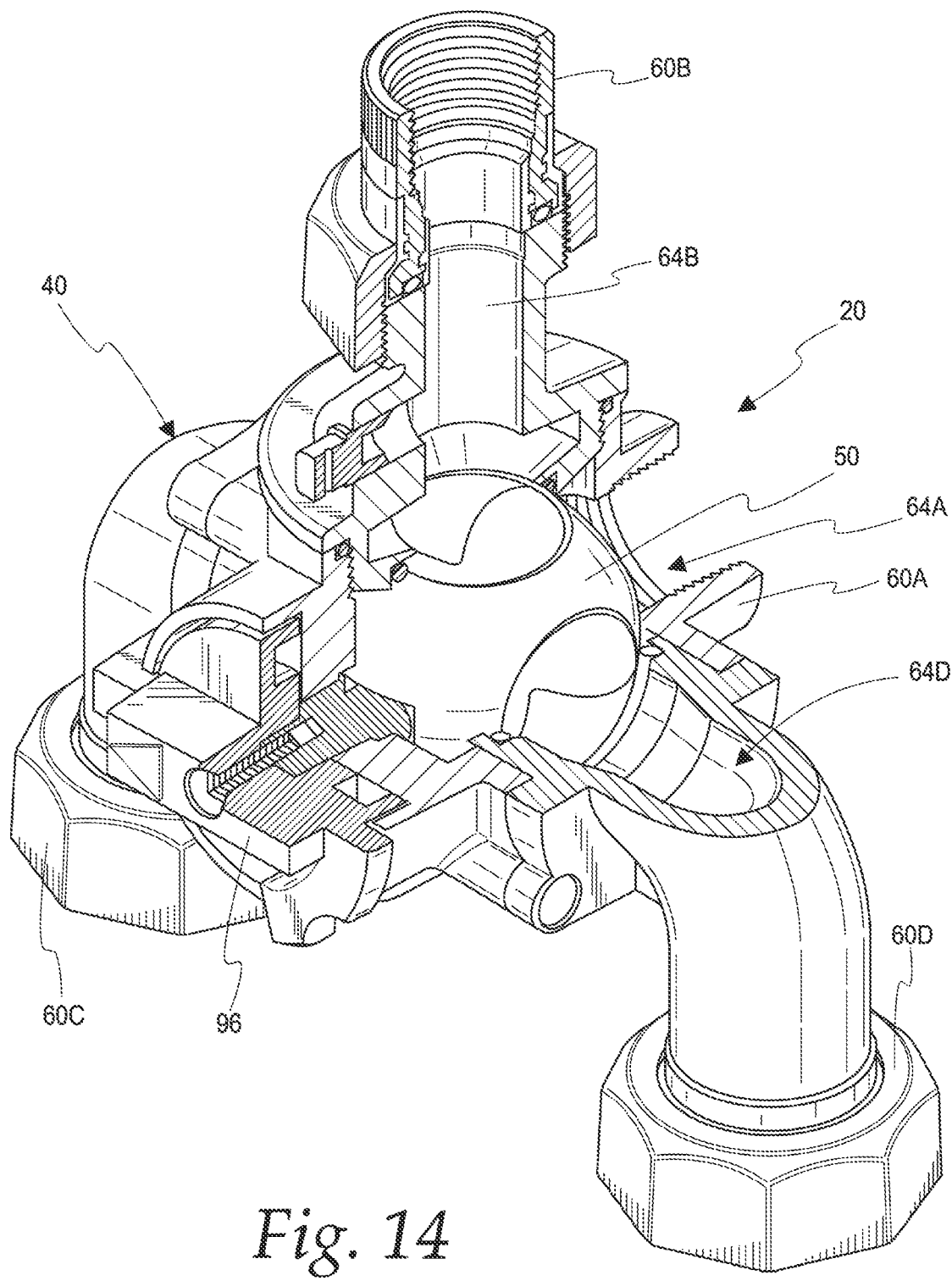
FIG. 14 is a cutaway isometric view of the meter bar of FIG. 1.

However, the valve 90 may take on any number of other forms of valves as understood by those skilled in the art as suitable for use in a meter bar 40. The type of valve chosen may depend on a number of factors such as the physical form of the fluid, such as liquid or gas, and the actual fluid that is flowing, such as natural gas as compared to oxygen. For example, FIG. 13 illustrates a generally spherical valve 90a which would be suitable for use in the generically spherical void 50a in the meter bar 40a of FIGS. 10-12.

The meter bar 40 may also advantageously include a number of other additional features. For example, the meter bar 40 may include a mounting tab 100 (as seen in FIG. 12) to structurally mount the meter bar 20. The location and orientation of the mounting tab 100 may be adjusted as desired. A test tap 110 (see FIGS. 6 and 11) may also be included for testing the fluid pressure.

Figure 6:
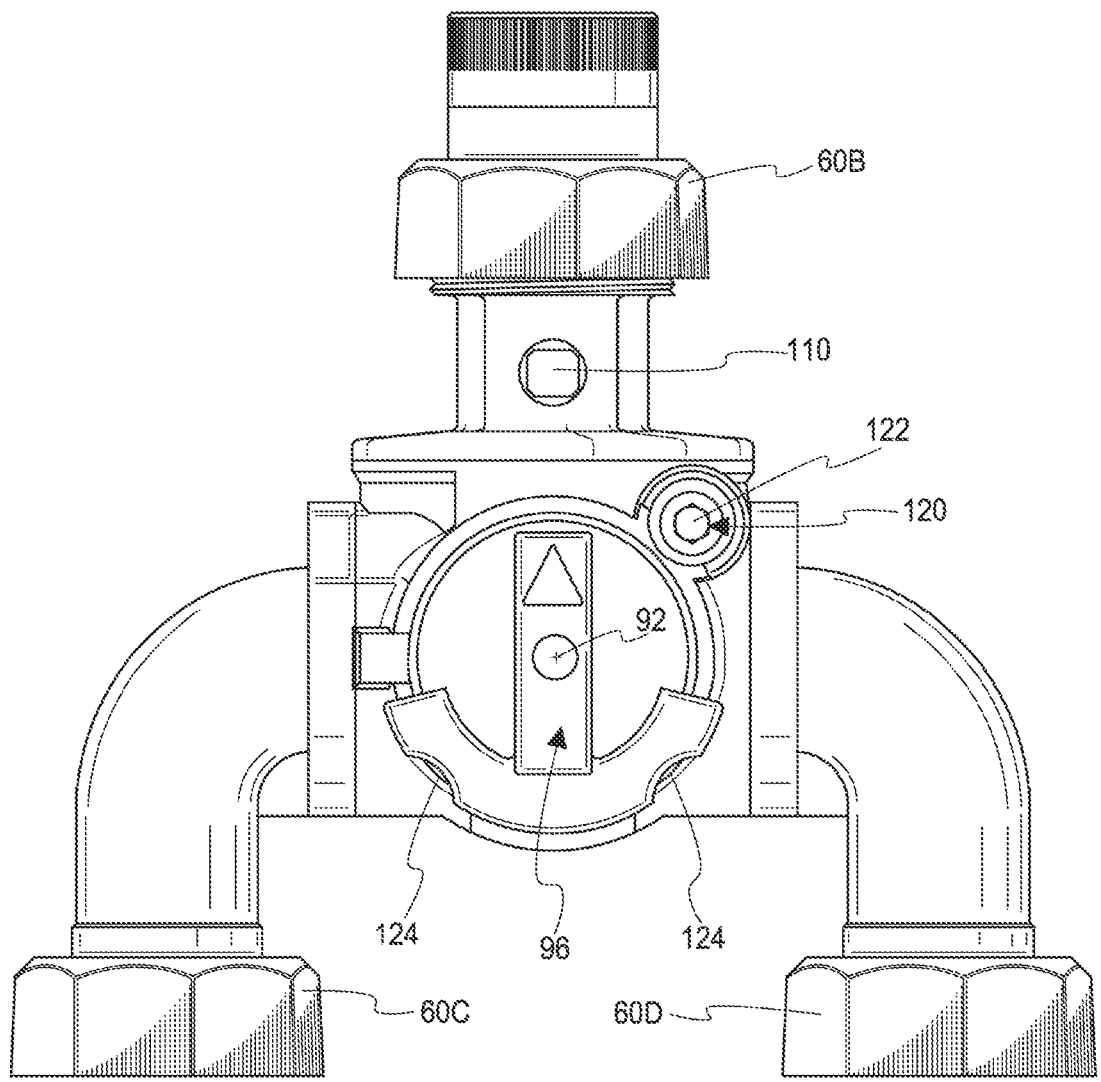
FIG. 6 is a front exterior view of the meter bar of FIG. 1.
Figure 7:
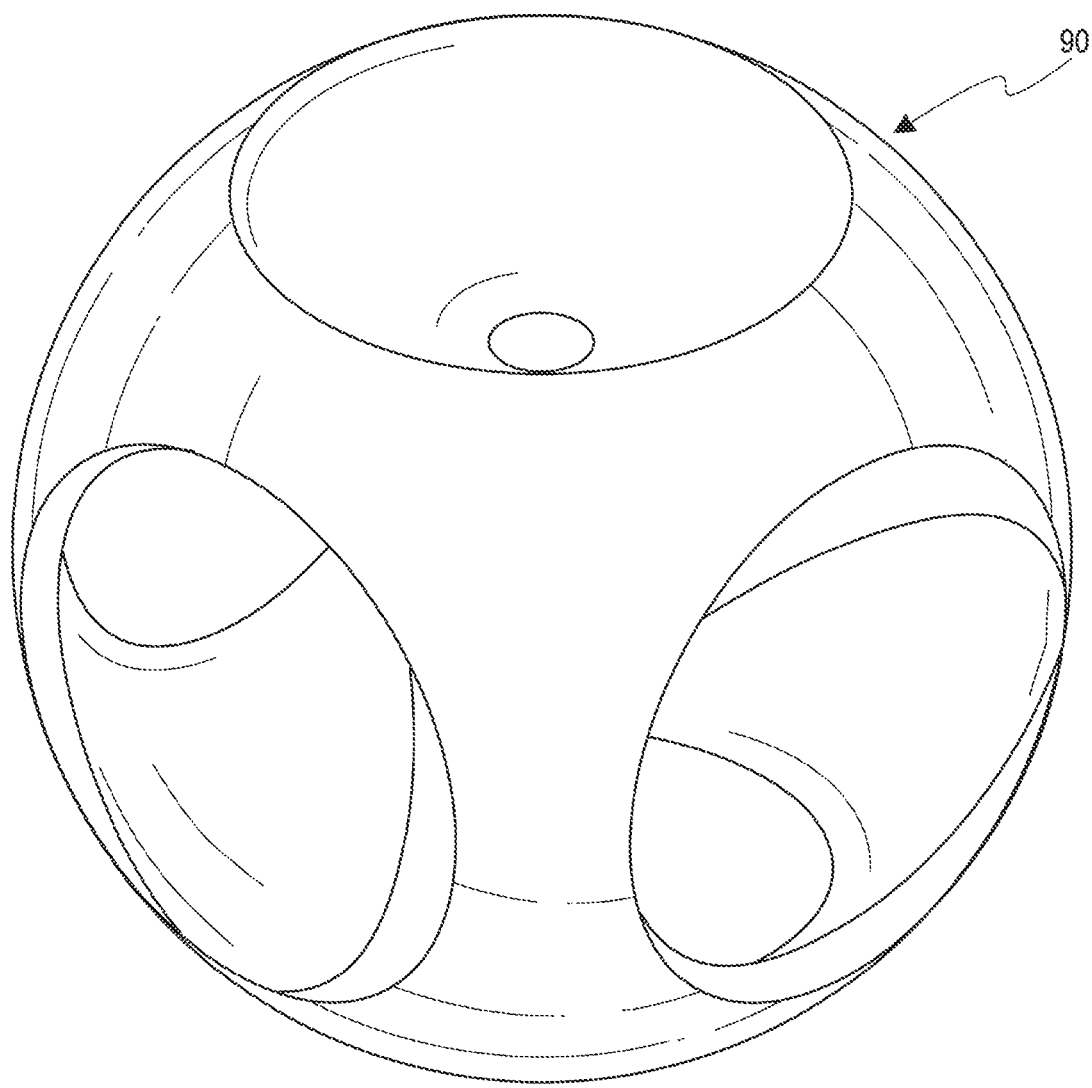
FIG. 7 is a perspective view of a ball valve as used with the meter bar of FIG. 1.
Figure 9C:
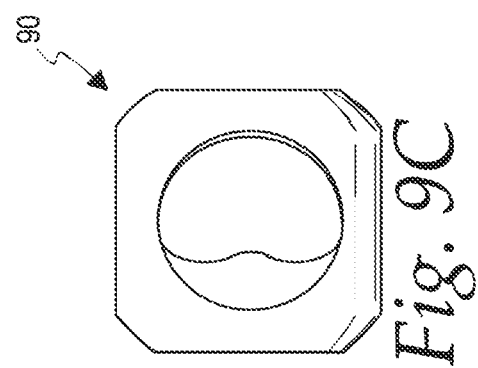
FIGS. 9A to 9F are views of the FIG. 7 ball valve taken from directions corresponding to the direction of the FIGS. 8A-8F sections.
Figure 9B:
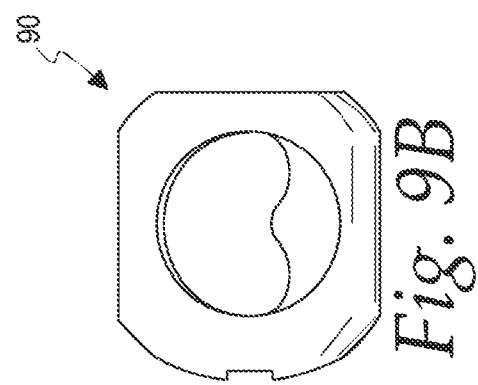
Figure 9F:
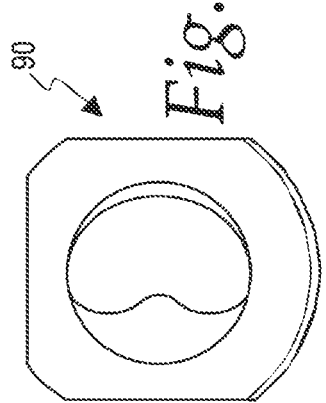
Figure 9A:
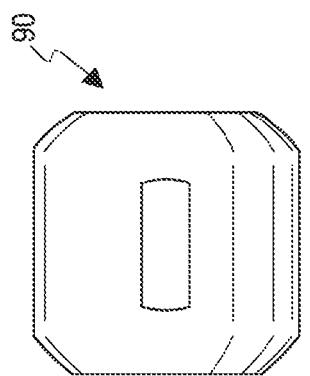
Figure 9E:
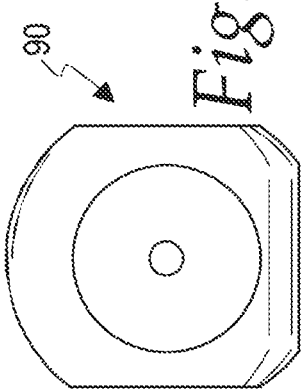
Figure 9D:
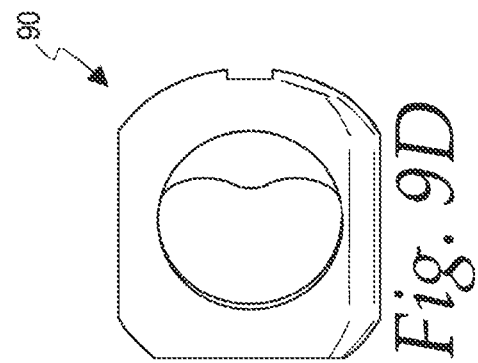

Safety features may also be readily and advantageously incorporated into the meter bar 40. For example, as best seen in FIG. 6 the meter bar 40 may include one or more locks 120 to prevent movement of the valve 90 from one position to another, either by accident or by an unauthorized user. In the illustrated embodiments, the locks are in the form of a fastener 122 that engages a relief 124 formed on an external drive member 96 of the valve 90. Advantageously, the valve 90 can be locked in either the metering or shutoff positions. Suitable locks are further illustrated in U.S. Pat. No. 5,799,687 to Eckel et al., the disclosure of which is hereby incorporated by reference.

The meter bar 40 may also include indicators 130 to indicate the position of the valve 90 (see, e.g., FIG. 11). Numbers may also be used as indicators, where the numbers indicate the sequential position of the valve 90 when changing the bar 40 from the metering mode to the bypass mode (where the meter 30 can be removed and serviced), and then returned back to the metering mode after the meter 30 has been serviced.

Figure 16:
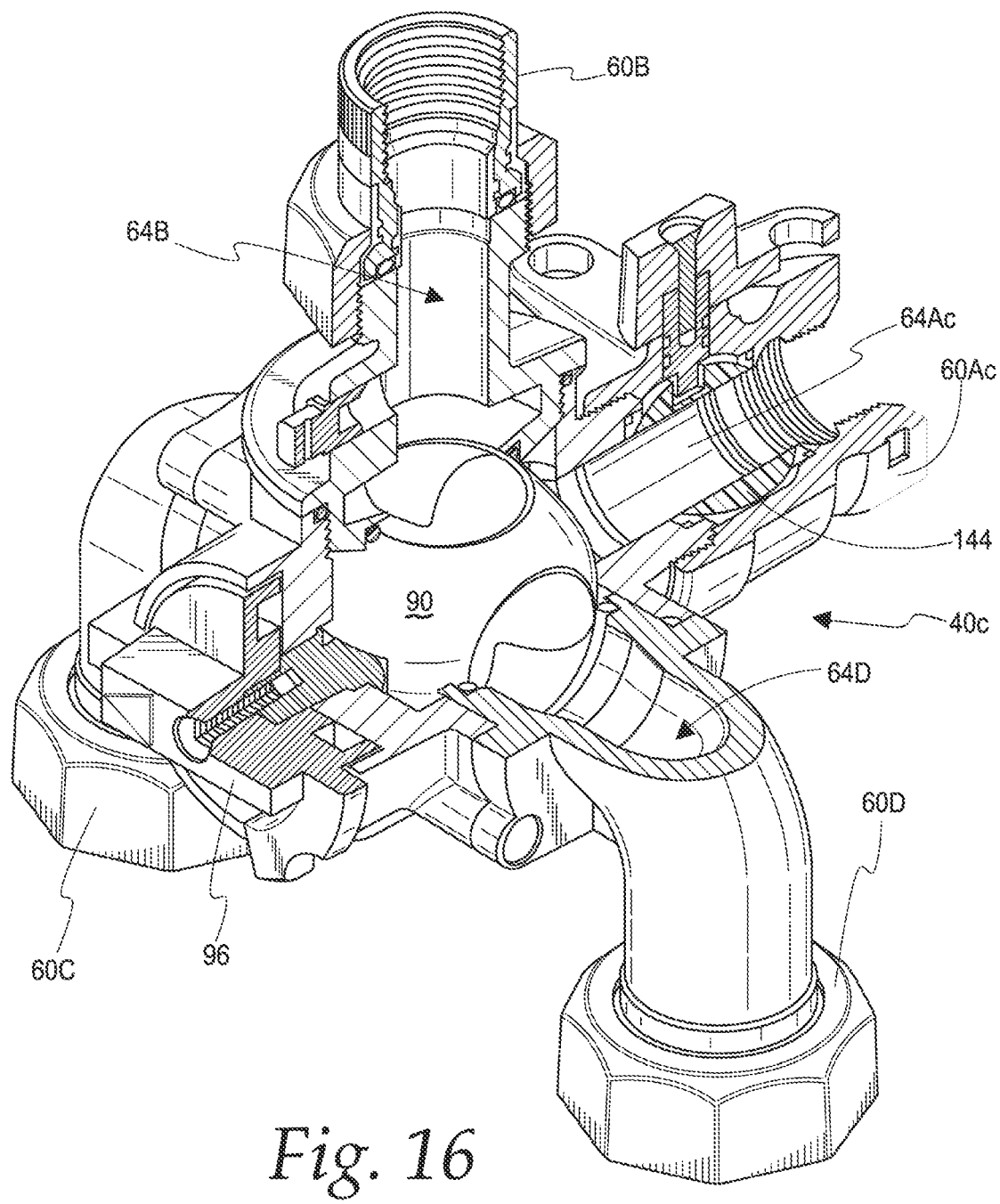
FIG. 16 is a cutaway isometric view of a meter bar with inlet valve shutoff.
Figure 17:
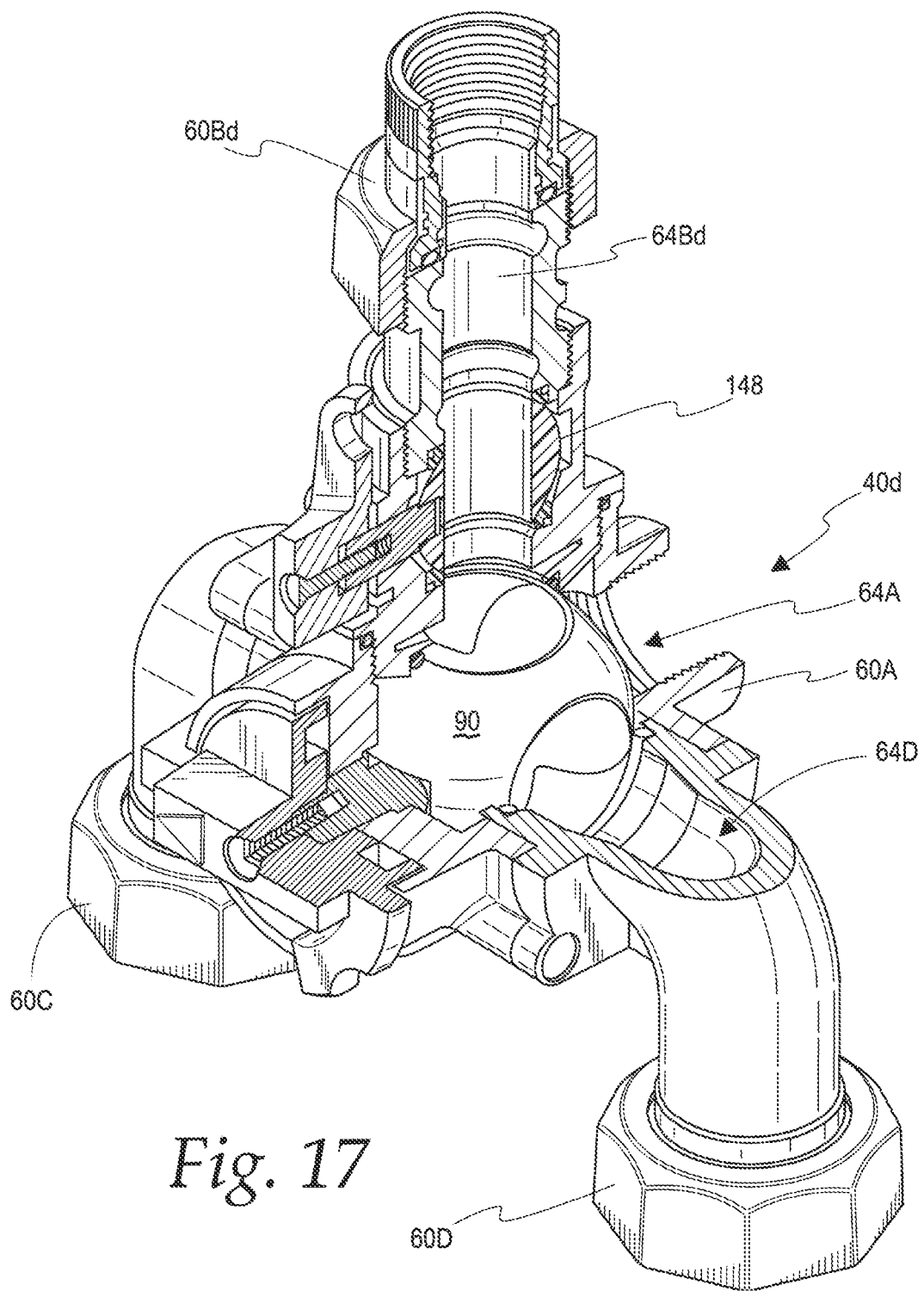
FIG. 17 is a cutaway isometric view of a meter bar with outlet valve shutoff.

Still other flow control features may also be incorporated into the meter bar 40. For example, as seen in the alternate embodiment of FIG. 15, the meter bar 40*b* may include a second valve 140 in the meter inlet passage 64Cb, serving as an alternate service shutoff. In another example, as seen in FIG. 16, the meter bar 40*c* includes a second valve 144 in the service inlet passage 64Ac, serving as a shutoff valve. In yet another example, as seen in FIG. 17, the meter bar 40*d* includes a second valve 148 in the service outlet passage 64Bd, which can also serve as a shutoff valve. In these three examples, the second valve 140, 144, 148 is shown as a rotatable angle ball valve, operated by a cap and stem protruding from the valve. However, the second valve 140, 144, 148 may take other suitable forms. It should be appreciated that such second valves 140, 144, 148 may function to advantageously provide customer access and the ability to shutoff service if desired, as well as allowing firemen to shut off the service in case of a fire, while at the same time allowing for the advantageous operation of the valve 90, including locking (by, e.g., locks 120) of the valve 90 at all times (to eliminate tampering and unwanted bypassing to avoid billing).

The invention claimed is:

1. A meter connector for connecting a flow meter to a fluid line, comprising:
   a meter bar including
      a fluid inlet service port and a fluid outlet service port removably connectable in-line to said fluid line,
      a first meter connector and a second meter connector, both removably connectable to said meter, and
      an internal void within a boundary, wherein said boundary has first, second, third and fourth openings therethrough wherein
         said first opening connects a fluid passage from said fluid inlet service port to said void,
         said second opening connects a fluid passage from said first meter connector to said void,
         said third opening connects a fluid passage from said second meter connector to said void, and
         said fourth opening connects a fluid passage from said fluid outlet service port to said void; and
      a valve rotatable within said meter bar void, the valve movable between a metering position, a bypass position, and a shutoff position wherein
         in the metering position, a first valve passage connects said first opening to said second opening and a second valve passage connects said third opening to said fourth opening,
         in the bypass position, the first valve passage connects said first opening to said fourth opening and the valve blocks said second and third openings from others of said openings, and
         in the shutoff position, the valve blocks said first opening from the second, third and fourth openings.

2. The meter connector of claim 1, wherein in at least one intermediate position between the metering and bypass positions, the valve simultaneously connects the first opening to both the second and fourth openings.

3. The meter connector of claim 1, wherein said void is within a spherical boundary.

4. The meter connector of claim 3, wherein said valve is substantially spherical with at least said first valve passage therein.

5. The meter connector of claim 1, further comprising a lock on the valve to selectively prevent the valve from moving between the metering and bypass positions.

6. The meter connector of claim 1 wherein said first valve passage is sufficiently sized to define a flow path between the first boundary opening to both said second and fourth openings when the valve is in an intermediate position between the metering and bypass positions.

7. The meter connector of claim 6 further comprising indicators on exterior surfaces of the meter bar indicating the position of the valve.

8. The meter connector of claim 6 wherein the valve in the bypass position defines a flow path between the fluid inlet service port and the fluid outlet service port.

9. The meter connector of claim 1, further comprising: the flow meter having a first fluid connection removably connected to the first meter connector, a second fluid connection coupled to the second meter connector whereby in said metering position fluid flows through said meter from said first fluid connection to said second fluid connection.

10. The meter connector of claim 1, further comprising a shutoff valve in a selected one of said fluid passages.

11. The meter connector of claim 1, further comprising seals around said first opening, said second opening, said third opening and said fourth opening, wherein said valve sits against said seals in said metering position, said bypass position and said shutoff position.

12. A meter connector for connecting a flow meter to a fluid line, comprising: a meter bar including a fluid inlet service port and a fluid outlet service port removably connectable in-line to said fluid line, a first meter connector and a second meter connector, both removably connectable to said meter, and an internal void within a boundary, wherein said boundary is spherical and has first, second, third and fourth openings therethrough wherein said first opening connects a fluid passage from said fluid inlet service port to said void, said second opening connects a fluid passage from said first meter connector to said void, said third opening connects a fluid passage from said second meter connector to said void, and said fourth opening connects a fluid passage from said fluid outlet service port to said void; a spherical valve rotatable about a radius of the spherical boundary within said meter bar void, the valve movable between a metering position, a bypass position, and a shutoff position wherein in the metering position, a first valve passage connects said first opening to said second opening and a second valve passage connects said third opening to said fourth opening, in the bypass position, the first valve passage connects said first opening to said fourth opening and the valve blocks said second and third openings from others of said openings, and in the shutoff position, the valve blocks said first opening from the second, third and fourth openings; and a lock on the valve to selectively prevent the valve from moving between the metering and bypass positions; wherein said first valve passage is sufficiently sized to define a flow path between the first boundary opening to both said second and fourth openings when the valve is in an intermediate position between the metering and bypass positions.

13. The meter connector of claim 12, wherein in at least one intermediate position between the metering and bypass positions, the valve simultaneously connects the first opening to both the second and fourth openings.

14. The meter connector of claim 12 further comprising indicators on exterior surfaces of the spherical valve and meter bar indicating the position of the valve.

15. The meter connector of claim 12 wherein the valve in the bypass position defines a flow path between the fluid inlet service port and the fluid outlet service port.

16. The meter connector of claim 12, further comprising: the flow meter having a first fluid connection removably connected to the first meter connector, a second fluid connection coupled to the second meter connector whereby in said metering position fluid flows through said meter from said first fluid connection to said second fluid connection.

17. The meter connector of claim 12, further comprising seals around said first opening, said second opening, said third opening and said fourth opening, wherein said valve seats against said seals in said metering position, said bypass position and said shutoff position.

18. The meter connector of claim 12, further comprising a shutoff valve in a selected one of said fluid passages.

* * * * *